(12) United States Patent
Momoi et al.

(10) Patent No.: US 8,467,571 B2
(45) Date of Patent: Jun. 18, 2013

(54) ORDERED RECOGNITION OF CONNECTED OBJECTS

(76) Inventors: Akiyoshi Momoi, Kawasaki (JP); Kinya Osa, Tokyo (JP); Ryoko Mise, Kawasaki (JP)

( * ) Notice: Subject to any disclaimer, the term of this patent is extended or adjusted under 35 U.S.C. 154(b) by 821 days.

(21) Appl. No.: 12/571,219

(22) Filed: Sep. 30, 2009

(65) Prior Publication Data

US 2010/0086213 A1 Apr. 8, 2010

(30) Foreign Application Priority Data

Oct. 2, 2008 (JP) .................................. 2008-257784

(51) Int. Cl.
G06K 9/00 (2006.01)
(52) U.S. Cl.
CPC .................................. *G06K 9/00362* (2013.01)
USPC ......................................................... 382/103
(58) Field of Classification Search
None
See application file for complete search history.

(56) References Cited

U.S. PATENT DOCUMENTS

| | | | | |
|---|---|---|---|---|
| 6,674,877 | B1 * | 1/2004 | Jojic et al. ..................... | 382/103 |
| 7,382,894 | B2 | 6/2008 | Ikeda et al. | |
| 7,688,349 | B2 * | 3/2010 | Flickner et al. ............... | 348/150 |
| 2004/0042661 | A1 * | 3/2004 | Ulrich et al. .................. | 382/181 |

FOREIGN PATENT DOCUMENTS

| | | |
|---|---|---|
| JP | 10063855 | 3/1998 |
| JP | 2001109891 | 4/2001 |
| JP | 2004-094954 A | 3/2004 |
| JP | 2005339522 | 12/2005 |
| JP | 2006202049 | 8/2006 |

OTHER PUBLICATIONS

Haritaoglu et al. (1998) "W4S: A real-time system for detecting and tracking people in 2 ½ D." LNCS vol. 1406, pp. 877-892.*
Jojic et al. (1999) "Tracking self-occluding articulated objects in dense disparity maps." Proc. 7th IEEE Int'l Conf. on Computer Vision, pp. 123-130.*

(Continued)

*Primary Examiner* — Barry Drennan
(74) *Attorney, Agent, or Firm* — Fitzpatrick, Cella, Harper & Scinto

(57) ABSTRACT

An image recognition apparatus that recognizes an object related to a certain object in an image sequentially recognizes an object from the image in accordance with recognition-order information that indicates an object order in an object sequence including the certain object, the related object, and an object connected between those objects. The apparatus determines whether or not an object recognized in a current turn of recognition has a connective relationship with an extracted object obtained in a previous turn of recognition, and obtains the object that has been determined as having a connective relationship as an extracted object. Based on an object extracted by a repetition of the above processing, that is, recognition, connective relationship determination, and obtaining, in the above-described recognition order, the related object is associated with the certain object.

5 Claims, 18 Drawing Sheets

OTHER PUBLICATIONS

Ju et al. (Oct. 1996) "Cardboard people: a parameterized model of articulated image motion." Proc. 2nd Int'l Conf. on Automatic Face and Gesture Recognition, pp. 38-44.*

Sigal et al. (2004) "Tracking loose-limbed people." Proc. 2004 IEEE CS Conf. on Computer Vision and Pattern Recognition, vol. 1 pp. 421-428.*

Wren et al. (Jul. 1997) "Pfinder: Real-time tracking of the human body." IEEE Trans. on Pattern Analysis and Machine Intelligence, vol. 19 No. 7, pp. 780-785.*

"Snakes: Active Contour Models" by Michael Kass et al. International Journal of Computer Vision, pp. 321-331, 1988.

"A Method for Extracting an Object by Segmentation based on General Information between Regions" by Toru Tamaki, et. al. The Journal of the Institute of Image Information and Television Engineers, vol. 55, No. 4, pp. 571-582, 2001.

Japanese Office Action issued Jul. 20, 2012, concerning Japanese Patent No. 2008-257784.

Kameda et al., "A Pose Estimation Method for an Articulated Object from its Silhouette Image", The Transactions of the Institute of Electronics, Information and Communication Engineers, Japan, vol. J79-D-II, No. 1, Jan. 1996, pp. 26-35.

* cited by examiner

RECOGNITION OF PERSON A

RECOGNITION OF NECKS

DETERMINATION OF CONNECTION BETWEEN FACE AND NECK

RECOGNITION OF BODIES

DETERMINATION OF CONNECTION BETWEEN NECK AND BODY

RECOGNITION OF ARMS

DETERMINATION OF CONNECTION BETWEEN BODY AND ARMS

RECOGNITION OF BAGS

DETERMINATION OF CONNECTION BETWEEN ARM AND BAG

FIG. 3

| TARGETS (MAJOR CATEGORIES) | TARGETS (SUB-CATEGORIES) | FEATURE VECTORS |
|---|---|---|
| BAG | BAG 1 | V1 |
|  | BAG 2 | V2 |
|  | ... | ... |
| ARM | ARM 1 | V3 |
|  | ARM 2 | V4 |
|  | ... | ... |
| ... | ... | ... |

FIG. 6

| OBJECT 1 | OBJECT 2 |
|----------|----------|
| FACE | NECK |
| FACE | HAIR |
| FACE | EAR |
| NECK | BODY |
| BODY | LEG |
| BODY | ARM |
| ... | ... |

FIG. 12
| TARGET | PERIPHERAL OBJECT |
|---|---|
| BAG | HAND 1 |
|  | HAND 2 |
|  | ... |
| SHOE | LEG 1 |
|  | LEG 2 |
|  | ... |
| ... | ... |
FIG. 13A
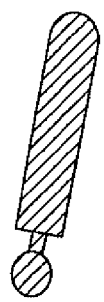
FIG. 13B
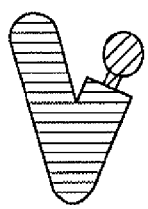
FIG. 13C
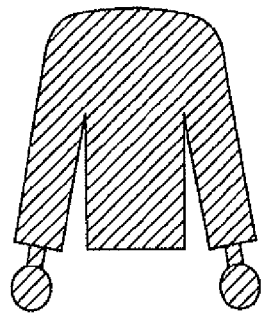

FIG. 14

| TARGET | PERIPHERAL OBJECT | REGION ESTIMATION RANGE |
|---|---|---|
| BAG | HAND 1 | 100-BY-100 PIXEL REGION CENTERED ON HAND 1 |
| | HAND 2 | 100-BY-100 PIXEL REGION BELOW HAND 2 |
| | ... | ... |
| SHOE | LEG 1 | 10-BY-10 PIXEL REGION BELOW LEG 1 |
| | LEG 2 | 10-BY-10 PIXEL REGION BELOW LEG 2 |
| | ... | ... |
| ... | | |

F I G. 21

| TARGET | PERIPHERAL OBJECT | POSITION AND CONNECTION INFORMATION |
|---|---|---|
| BAG | HAND 1 | LINEAR OBJECT CONNECTED TO POSITION XXX OF HAND 1, AND OBJECT CONNECTED TO THAT LINEAR OBJECT |
| | HAND 2 | LINEAR OBJECT CONNECTED TO POSITION YYY OF HAND 2, AND OBJECT CONNECTED TO THAT LINEAR OBJECT |
| | ... | ... |
| SHOE | LEG 1 | OBJECT CONNECTED TO POSITION XXX OF LEG 1 |
| | LEG 2 | OBJECT CONNECTED TO POSITION YYY OF LEG 2 |
| | ... | ... |
| ... | | |

ORDERED RECOGNITION OF CONNECTED OBJECTS

BACKGROUND OF THE INVENTION

1. Field of the Invention

The present invention relates to an image recognition apparatus that recognizes a target in an input image, and an image recognition method.

2. Description of the Related Art

Conventionally, there are image recognition apparatuses that recognize a plurality of targets in an input image and associate those targets. Consider the case where a bag carried by a person A is recognized from an input image shown in FIG. 10, for example. In the case of this example, a plurality of targets are the person A and his or her bag. To establish an association between the person A and his or her bag, the face of the person A and the bag are recognized from the input image. If the face of the person A and the bag are recognized, a relationship between those two objects is determined using a certain method so as to recognize the bag carried by the person A.

Examples of such a method for associating two detected targets are disclosed in Japanese Patent Laid-Open No. 2006-202049 (hereinafter referred to as "Patent Document 1") and Japanese Patent Laid-Open No. 2005-339522 (hereinafter referred to as "Patent Document 2"). With Patent Document 1, a plurality of targets recognized on the same screen are considered as being related to one another and are associated with one another. In an exemplary embodiment of Patent Document 1, a face and a name tag are recognized; if a face and a name tag are recognized on the same screen, they are considered as being related to each other and are associated with each other. Applying this method to the example of recognizing the bag carried by the person A, if the person A and a bag are recognized on the same screen, the bag recognized is associated as a person A's bag. With Patent Document 2, a plurality of recognized targets are associated with one other according to their relative positions. In an exemplary embodiment of Patent Document 2, a face is recognized and an object located above the recognized face is recognized as hair. Applying this method to the case of recognizing the bag carried by the person A, if the person A and a bag have been recognized, a bag located below the face of the person A is associated as a person A's bag.

The above-described concept is based on the presence of an image recognition apparatus that recognizes a target in an input image; such an image recognition apparatus generally has a configuration described below. FIG. 22 illustrates a configuration of such an image recognition apparatus, in which an image input unit 1, a to-be-recognized-target designation unit 2, and a display unit 6 are connected to an image recognition apparatus 10. The image recognition apparatus 10 includes a target recognition unit 3, a parameter selection unit 4, and a recognition-parameter storage unit 5.

The operation of a general image recognition apparatus with such a configuration when recognizing a target will now be described.

The recognition-parameter storage unit 5 stores information that is used in processing performed by the target recognition unit 3. This information varies depending on the algorithm used in the target recognition unit 3; for example, if the target recognition unit 3 uses an algorithm based on a neural network, the recognition parameter is a synaptic weight value on the neural network. The parameter selection unit 4 selects a necessary recognition parameter that varies depending on a target to be recognized and transfers the necessary parameter to the target recognition unit 3. The target recognition unit 3 recognizes a target from an image input from the image input unit 1, using the parameter received from the parameter selection unit 4. The display unit 6 displays the result of processing performed by the target recognition unit 3, specifically, a region of a recognized target in the image, the number of targets, and so on.

With the method described in Patent Document 1 in which a plurality of targets recognized on the same screen are considered as being related to one another, in the case of an input image as shown in FIG. 10, establishing proper associations is difficult because the bag carried by a person B is also associated as a person A's bag.

With the method described in Patent Document 2 in which a plurality of targets are associated according to their relative positions, in the case of an input image as shown in FIG. 10, a bag located below a hand is associated with the hand according to the relative positions of the hand and the bag. Thus, again, the bag carried by the person B is associated as a person A's bag and proper associations cannot be established.

The following two factors are considered as reasons for such a failure in target recognition processing performed for the association of targets by conventional image recognition apparatuses.

The first factor is the case where a recognition target is unknown to an image recognition apparatus. Recognition parameters are generated using information regarding only known recognition targets, and a target recognition unit performs recognition processing using a recognition parameter generated with respect to a known recognition target. This implies that the target recognition unit cannot obtain information on an unknown recognition target and thus cannot recognize an unknown recognition target. To solve this problem, there is a suggestion that recognition parameters be generated in advance from all sorts of known recognition targets; however, in reality, preparing all sorts of recognition targets will be difficult. Such cases include a case where there are an infinite number of variations of recognition targets, and a case where a new sort of recognition targets appears at frequent intervals. One example of such cases is bags. There are all colors, shapes, and sizes of different bags in the world, and still, a day hardly goes by without new bags being put on the market, so that the variety of bags is increasing day by day.

The second factor is the case where an input image is in unfavorable conditions. Examples of such an image in unfavorable conditions include the case where a recognition target is inclined more than a permissible level and the case where a part of a recognition target is hidden.

SUMMARY OF THE INVENTION

The present invention has been made in view of the aforementioned problems, and an exemplary embodiment of the present invention provides an image recognition apparatus and method that enable the proper association of targets.

Also, another exemplary embodiment of the present invention provides an image recognition apparatus and method that enable more accurate estimation of a target even though the target is unknown to the image recognition apparatus or even though an input image is in unfavorable conditions for recognition processing.

According to one aspect of the present invention, there is provided an image recognition apparatus that recognizes an object related to a certain object in an image, comprising: a recognition unit configured to sequentially recognize an object from the image in accordance with recognition-order information that indicates an object order in an object sequence including the certain object, the related object, and an object connected between the certain object and the related object; a connective relationship determination unit configured to determine whether or not an object recognized in a current turn of recognition performed by the recognition unit has a connective relationship with an extracted object obtained in a previous turn of recognition; an obtaining unit configured to obtain an object that has been determined as having a connective relationship by the connective relationship determination unit, as an extracted object; and an associating unit configured to associate the certain object with the related object, based on an object extracted by a repetition of processing performed in the recognition order by the recognition unit, the connective relationship determination unit, and the obtaining unit.

According to another aspect of the present invention, there is provided an image recognition apparatus that recognizes a certain object in an image, comprising: a holding unit configured to hold association information that associates an object to be recognized and a peripheral object related to the object to be recognized; a peripheral-object recognition unit configured to recognize a peripheral object related to the certain object from the image, based on the association information; and an estimation unit configured to estimate a region where the certain object exists, by extracting an object that is located in a predetermined position with respect to a peripheral object recognized by the peripheral-object recognition unit.

According to another aspect of the present invention, there is provided an image recognition method for recognizing an object related to a certain object in an image, comprising: a recognition step of sequentially recognizing an object from the image in accordance with recognition-order information that indicates an object order in an object sequence including the certain object, the related object, and an object connected between the certain object and the related object; a connective relationship determination step of determining whether or not an object recognized in a current turn of recognition performed in the recognition step has a connective relationship with an extracted object obtained in a previous turn of recognition; an obtaining step of obtaining an object that has been determined as having a connective relationship in the connective relationship determination step, as an extracted object; and an associating step of associating the certain object with the related object based on an object extracted by a repetition of the recognition step, the connective relationship determination step, and the obtaining step in the recognition order.

According to another aspect of the present invention, there is provided an image recognition method for recognizing a certain object in an image, comprising: a holding step of holding association information that associates an object to be recognized and a peripheral object related to the object to be recognized; a peripheral-object recognition step of recognizing a peripheral object related to the certain object from the image based on the association information; and an estimation step of estimating a region where the certain object exists, by extracting an object that is located in a predetermined position with respect to a peripheral object recognized in the peripheral-object recognition step.

Further features of the present invention will become apparent from the following description of exemplary embodiments with reference to the attached drawings.

BRIEF DESCRIPTION OF THE DRAWINGS

FIG. 3 shows an example of recognition parameters according to the first exemplary embodiment.

FIG. 6 shows an example of connective relationship parameters according to the second exemplary embodiment.

FIG. 12 illustrates the associations between targets and peripheral objects according to the third exemplary embodiment.

FIGS. 13A to 13C show examples of a to-be-recognized peripheral object, in the case where the recognition target is a bag, according to the third exemplary embodiment.

FIG. 14 shows an example of region-estimation range parameters according to the third exemplary embodiment.

FIG. 21 shows an example of region estimation parameters according to the third exemplary embodiment.

DESCRIPTION OF THE EMBODIMENTS

Now, preferred exemplary embodiments of the present invention will be described with reference to the accompanying drawings.

First Exemplary Embodiment

Figure 1:
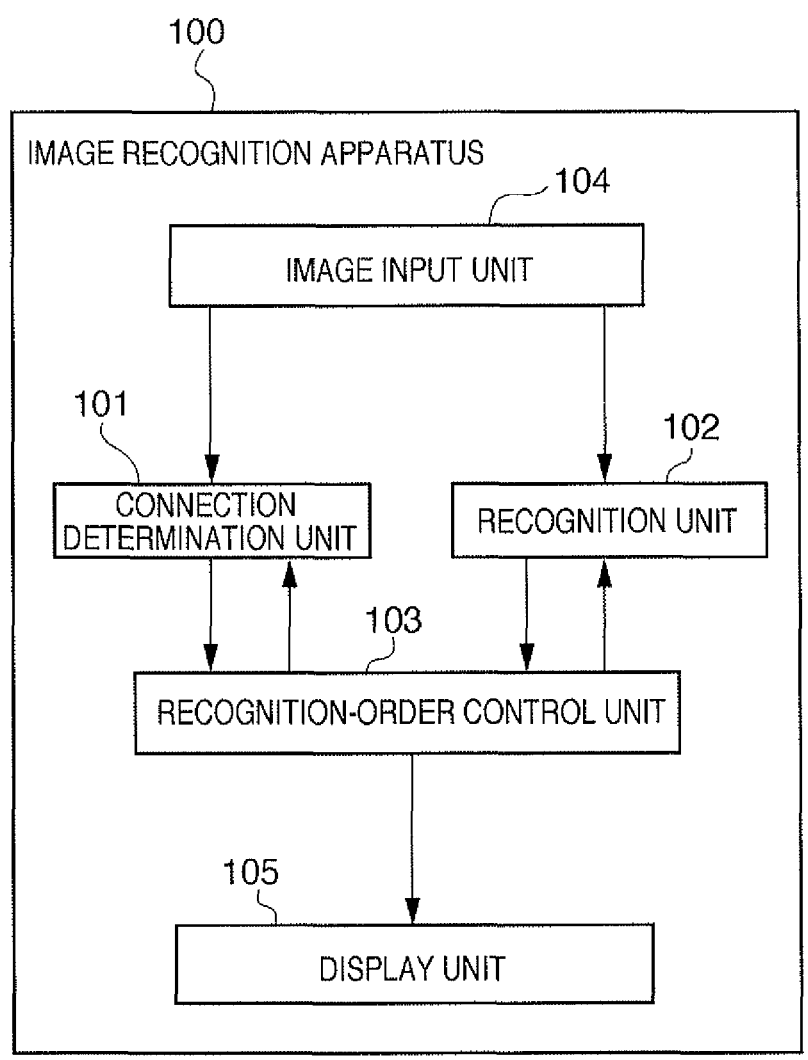
FIG. 1 is a block diagram showing an exemplary configuration of an image recognition apparatus according to a first exemplary embodiment.

FIG. 1 is a block diagram showing an exemplary configuration of an image recognition apparatus according to a first exemplary embodiment.

An image recognition apparatus 100 according to the first exemplary embodiment includes a connection determination unit 101, a recognition unit 102, a recognition-order control unit 103, an image input unit 104, and a display unit 105. An image that is subjected to recognition processing is input from the image input unit 104 into the connection determination unit 101 and the recognition unit 102. The image input unit 104 may be an image input device such as a network camera, a digital camera, or a scanner, for example. The display unit 105 displays the result of recognition performed by the image recognition apparatus 100. For example, if a recognized region is displayed as a result of recognition, a region of a target extracted from an input image is displayed filled in with a predetermined color.

The recognition-order control unit 103 selects an object to be recognized in an order of object recognition in which a plurality of targets are associated, and provides an instruction to the recognition unit 102, the connection determination unit 101, and the display unit 105. Note that in the specification of the invention, the term "object" refers to an object recognized by the recognition unit 102, and the term "target" refers to an object that is associated with another object from among other objects. In addition, the term "object-recognition order" in which a plurality of targets are associated refers to an object sequence along which a connective relationship between a plurality of targets can be traced. In other words, the recognition order refers to the order of connection of a certain object, an object related to the certain object, and any object(s) connected between those objects. For example, an object-recognition order in which a face and a bag held in a hand are associated with each other is as follows; the face, the neck, the body, the arm, and the bag. Although the present exemplary embodiment describes the case of a fixed recognition order, the present invention is not limited thereto. For example, the recognition order may be changed dynamically.

Figure 2A:
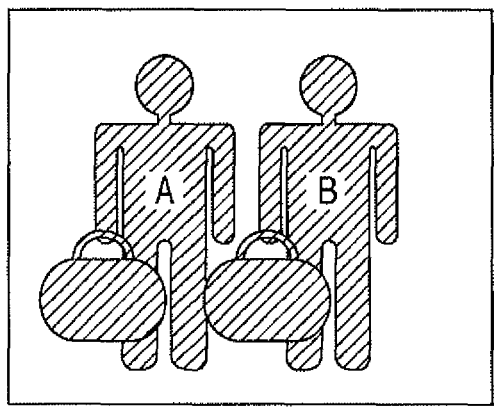
FIG. 2A shows an example of an input image according to the first exemplary embodiment.

The operation of the recognition-order control unit 103 will now be described, using an example where a bag carried by a person A is recognized from an image shown in FIG. 2A. In the case of this example, the object-recognition order is as follows: the face of the person A, the neck, the body, the arm, and the bag. The recognition-order control unit 103, as a first step, instructs the recognition unit 102 to recognize the face of the person A in accordance with the object-recognition order.

Figure 2B:
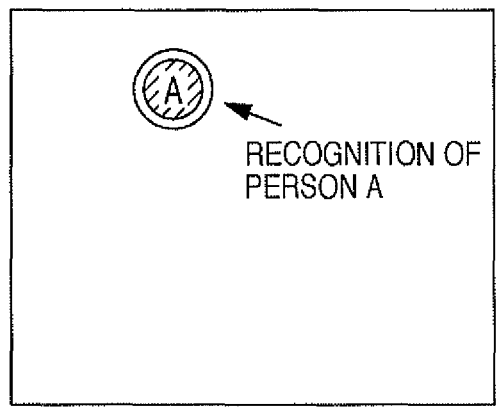
FIG. 2B shows the result of the recognition of a person A according to the first exemplary embodiment.
Figure 2C:
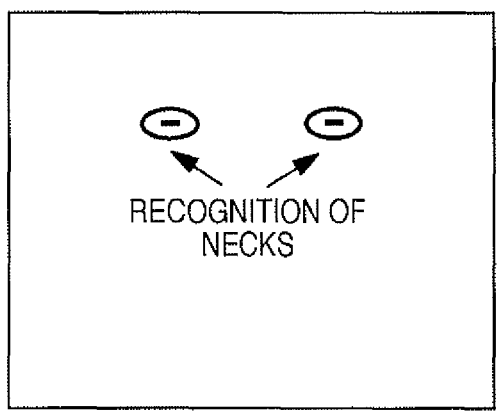
FIG. 2C shows an example of the result of the recognition of necks according to the first exemplary embodiment.
Figure 2D:
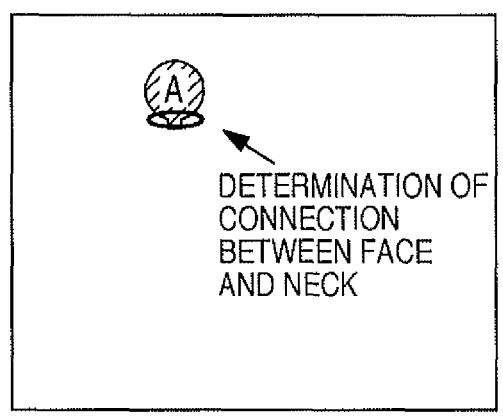
FIG. 2D shows an example of the result of the determination of a connective relationship between the face of the person A and his or her neck according to the first exemplary embodiment.

If the face of the person A has been recognized as shown in FIG. 2B, then the recognition-order control unit 103 instructs the recognition unit 102 to recognize a neck. If necks have been recognized as shown in FIG. 2C, then the recognition-order control unit 103 instructs the connection determination unit 101 to determine if there is a connective relationship between the face of the person A and a neck. If the determination has succeeded in finding a connective relationship between the face of the person A and a neck as shown in FIG. 2D, then the recognition-order control unit 103 instructs the recognition unit 102 to recognize a body.

Figure 2E:
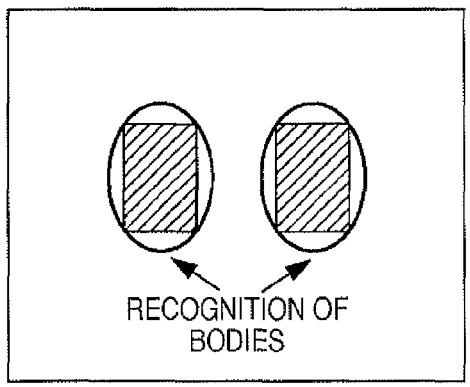
FIG. 2E shows an example of the result of the recognition of bodies according to the first exemplary embodiment.
Figure 2F:
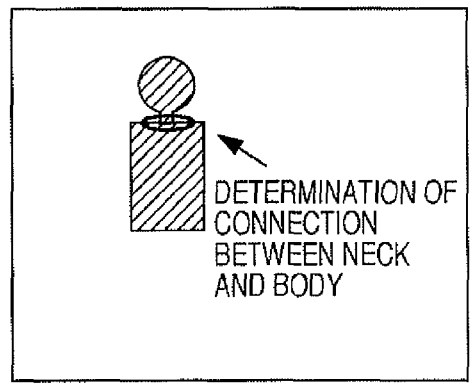
FIG. 2F shows an example of the result of the determination of a connective relationship between the neck and the body according to the first exemplary embodiment.
Figure 2G:
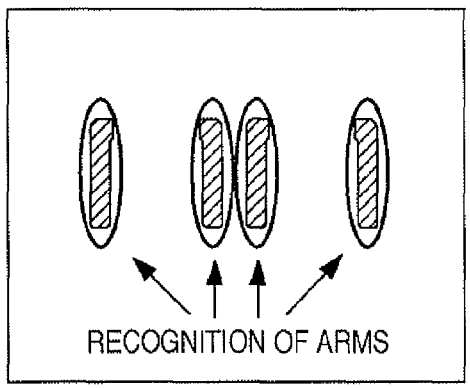
FIG. 2G shows an example of the result of the recognition of arms according to the first exemplary embodiment.
Figure 2H:
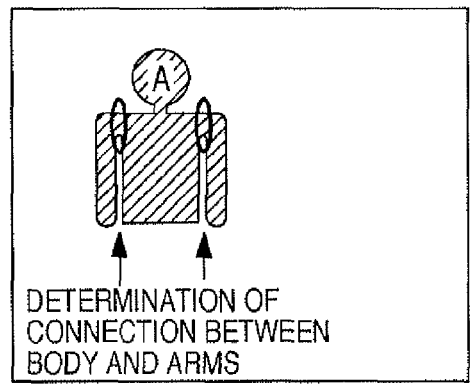
FIG. 2H shows an example of the result of the determination of a connective relationship between the body and the arms according to the first exemplary embodiment.

If the recognition of bodies has succeeded as shown in FIG. 2E, then the recognition-order control unit 103 instructs the connection determination unit 101 to determine if there is a connective relationship between the neck and a body. If the determination has succeeded in finding a connective relationship between the neck and a body as shown in FIG. 2F, then the recognition-order control unit 103 instructs the recognition unit 102 to recognize an arm. If the recognition of arms has succeeded as shown in FIG. 2G, then the recognition-order control unit 103 instructs the connection determination unit 101 to determine if there is a connective relationship between the body and an arm. If the determination has succeeded in finding a connective relationship between the body and an arm as shown in FIG. 2H, then the recognition-order control unit 103 instructs the recognition unit 102 to recognize a bag.

Figure 2I:
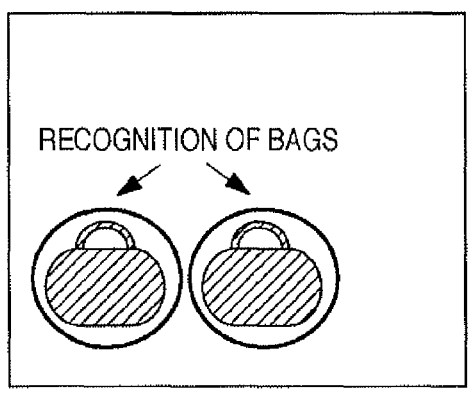
FIG. 2I shows an example of the result of the recognition of bags according to the first exemplary embodiment.
Figure 2J:
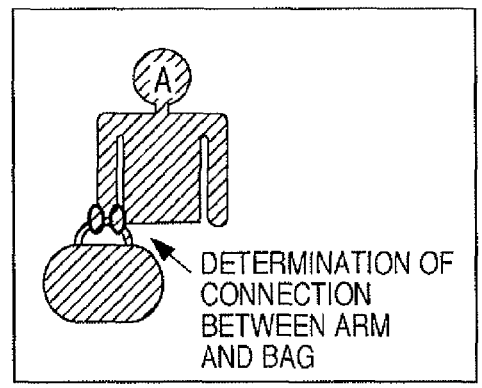
FIG. 2J shows an example of the result of the determination of a connective relationship between the arm and the bag according to the first exemplary embodiment.

If the recognition of bags has succeeded as shown in FIG. 2I, then the recognition-order control unit 103 instructs the connection determination unit 101 to determine if there is a connective relationship between the arm and a bag. If the determination has succeeded in finding a connective relationship between the arm and a bag as shown in FIG. 2J, then the recognition-order control unit 103 instructs the display unit 105 to display the result of recognition and completes the process.

The processing described above is an example of the operation of the recognition-order control unit 103. The operation of the recognition-order control unit 103 as described above is generalized and will be described below. In accordance with an object-recognition order, the recognition-order control unit 103, as a first step, instructs the recognition unit 102 to recognize a first object in the object-recognition order. The object-recognition order may be either set previously or set dynamically depending on a target designated for association (see a second exemplary embodiment, for example). If the recognition unit 102 has succeeded in recognizing the first object, then the recognition-order control unit 103 instructs the recognition unit 102 to recognize the second object in the object-recognition order. If the recognition of the second object has succeeded, then the recognition-order control unit 103 instructs the connection determination unit 101 to determine if there is a connective relationship between the first and second objects in the recognition order.

Thereafter, the selection of an object, recognition, and determination are repeated until the last object in the recognition order is recognized and the determination of a connective relationship between the last object and the second last object in the recognition order ends in success. The selection of an object is performed in accordance with an object-recognition order. Specifically, the connection determination unit 101 selects an object that has a connective relationship with an object extracted in the previous turn of recognition, from among objects recognized in the current turn of recognition performed by the recognition unit 102, as an object extracted in the current turn of recognition. The object obtained in the current turn of recognition is used for the next extraction. In addition, if the determination of a connective relationship between the last object and the second last object in the recognition order has ended in success, the recognition-order control unit 103 instructs the display unit 105 to display the result of recognition. However, if the recognition processing performed by the recognition unit 102 and/or the determination processing performed by the connection determination unit 101 have/has failed halfway through, the recognition-order control unit 103 instructs the display unit 105 to display a message indicating that the recognition processing and/or the connection determination processing have/has failed.

As described above, the recognition unit 102 recognizes an object indicated by the recognition-order control unit 103 from an image input from the image input unit 104, so that an object is recognized sequentially from the image in accordance with information about the recognition order. For object recognition, various algorithms have been proposed and the present invention may adopt any of such recognition algorithms. Alternatively, the configuration may be such that a recognition algorithm is changed depending on an object.

For example, the recognition unit 102 performs recognition processing by changing a recognition parameter held in the recognition unit 102 depending on an object indicated by the recognition-order control unit 103. The term "recognition parameter" as used herein refers to information such as coefficients that has been generated from a feature quantity of a known object and that is necessary for the recognition unit 102 to perform recognition processing. The term "feature quantity" as used herein is a numerical value that represents a unique feature for use in discriminating a certain object; one conceivable example is a numerical value that represents information such as an edge or a color, for example. In order to discriminate a certain object, it is generally necessary to determine a plurality of feature quantities, and such a set of necessary feature quantities is referred to as a feature vector. The recognition parameter may take various forms depending on the recognition algorithms. By way of example, one algorithm is described in which a certain feature quantity is extracted from an input image, and recognition is performed depending on the similarity between the extracted feature quantity and the feature quantity of a known object.

If V0 is the feature vector of a certain object extracted from an input image and V1 is the feature vector of a known object to be compared, those feature vectors can be expressed as follows:

$$V0=\{v00, v01, v02, v03\}$$

$$V1=\{v10, v11, v12, v13\}$$

The components vij of the feature vectors are numerical values that represent various feature quantities as described above. For example, in the case where the feature vector is edge information on an object, information such as the coordinates of an edge detected through known processing such as first-order differentiation may be used as the feature vector. The similarity, D, between the two feature vectors V0 and V1 is expressed as follows:

$$D=(\Sigma(v1j-v0j)2)(½) \qquad \text{(Expression 1)}$$

If the similarity, D, is lower than a given threshold value Thr, that is, if the following expression is satisfied, it is determined that an object extracted from an input image agrees with a known object to be compared.

$$D \leq Thr$$

Figures 9A, 9B, 9C:
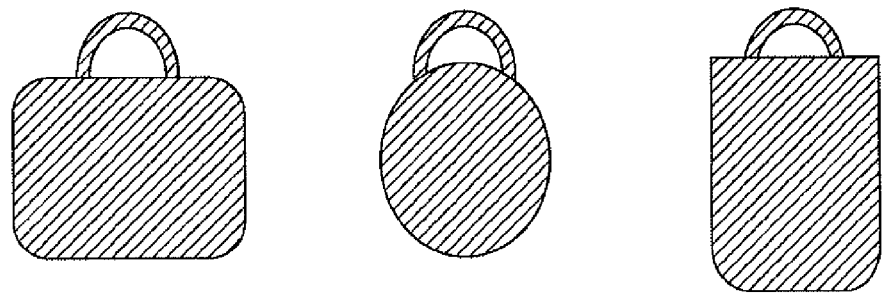
FIGS. 9A to 9C illustrate a bag by way of example as a target according to an exemplary embodiment.

In other words, an extracted object is recognized as a known object to be compared. In the case of this algorithm, the recognition parameter is the feature vector V1 of a known object to be compared. There are as many feature vectors V1 as known objects (recognition targets and to-be-recognized peripheral objects). Thus, the recognition unit 102 holds, for example, features vectors V1, V2, and so on for various "bags" as sub-categories under a major category of a "bag" as shown in FIG. 3. For example, there are a variety of bags as shown in FIGS. 9A to 9C, so that feature vectors for every kind of bag are stored in sub-categories. In this way, when a major category includes a plurality of sub-categories of known feature vectors, all those feature vectors may be compared with a feature vector V0 extracted from an input image, and an object having the lowest similarity may be recognized as a target.

The result of recognition processing performed by the recognition unit 102 is sent to the recognition-order control unit 103. Conceivable information sent back to the recognition-order control unit 103 includes the number of recognized objects and the coordinates of a recognized object in an input image, for example. Additionally in the present exemplary embodiment, the recognition unit 102 performs recognition processing on the whole area of an input image so that all objects in the input image are recognized. For example, in the case of FIG. 2C, recognition processing is performed on the whole area of the input image so that all necks in the input image have been recognized; however, the present invention is not limited thereto. For example, based on the position of the already-recognized face of the person A, a region that is subjected to recognition processing may be narrowed down so that the recognition of a neck is performed on only a region below the face region of the person A.

The connection determination unit 101 determines if there is a connective relationship between two objects indicated by the recognition-order control unit 103. For the determination of a connective relationship, various algorithms have been proposed; the present invention may use any of such connective relationship determination algorithms. Alternatively, the connective relationship determination algorithm may be changed depending on an object. Now, by way of example of how to determine a connective relationship, the way of determining a connective relationship using edge information on two objects will be described.

The connection determination unit 101, as a first step, receives information about the coordinates of two objects in an input image from the recognition-order control unit 103, and extracts edge information included in the received coordinates for each of the two objects. Such extraction of edge information is implemented by known processing such as first-order differentiation as described above in the explanation of the recognition unit 102. If the edge information on each of the two objects has been extracted, a commonality between the edges extracted from the two objects is determined. For example if the edge coordinates have been extracted as a result of edge extraction, the edge coordinates of the two objects are compared in order to count the number of common and continuous coordinates therebetween. If the number of common and continuous coordinates is equal to or greater than a threshold value, it can be determined that the two recognized objects have a connective relationship. The result of the determination of a connective relationship performed by the connection determination unit 101 is transmitted to the recognition-order control unit 103.

Figure 10:
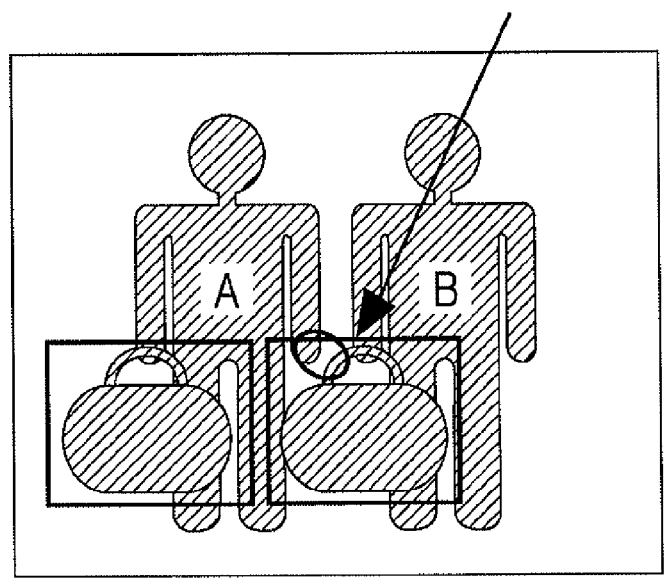
FIG. 10 is an explanatory diagram showing an example of misrecognition during image recognition processing according to conventional techniques.

For the association of a plurality of targets, it is important to determine a connective relationship. For example, consider the example where an image as shown in FIG. 2A is input and a bag carried by a person A is recognized. The input image includes two persons A and B each carrying a bag with his or her right hand. If it is determined according to their relative positions that a hand below a hand relates to the hand, the bag carried by the person B is associated by mistake as a bag carried by the person A as shown FIG. 10. The present exemplary embodiment prevents such misdetection.

Figure 4:
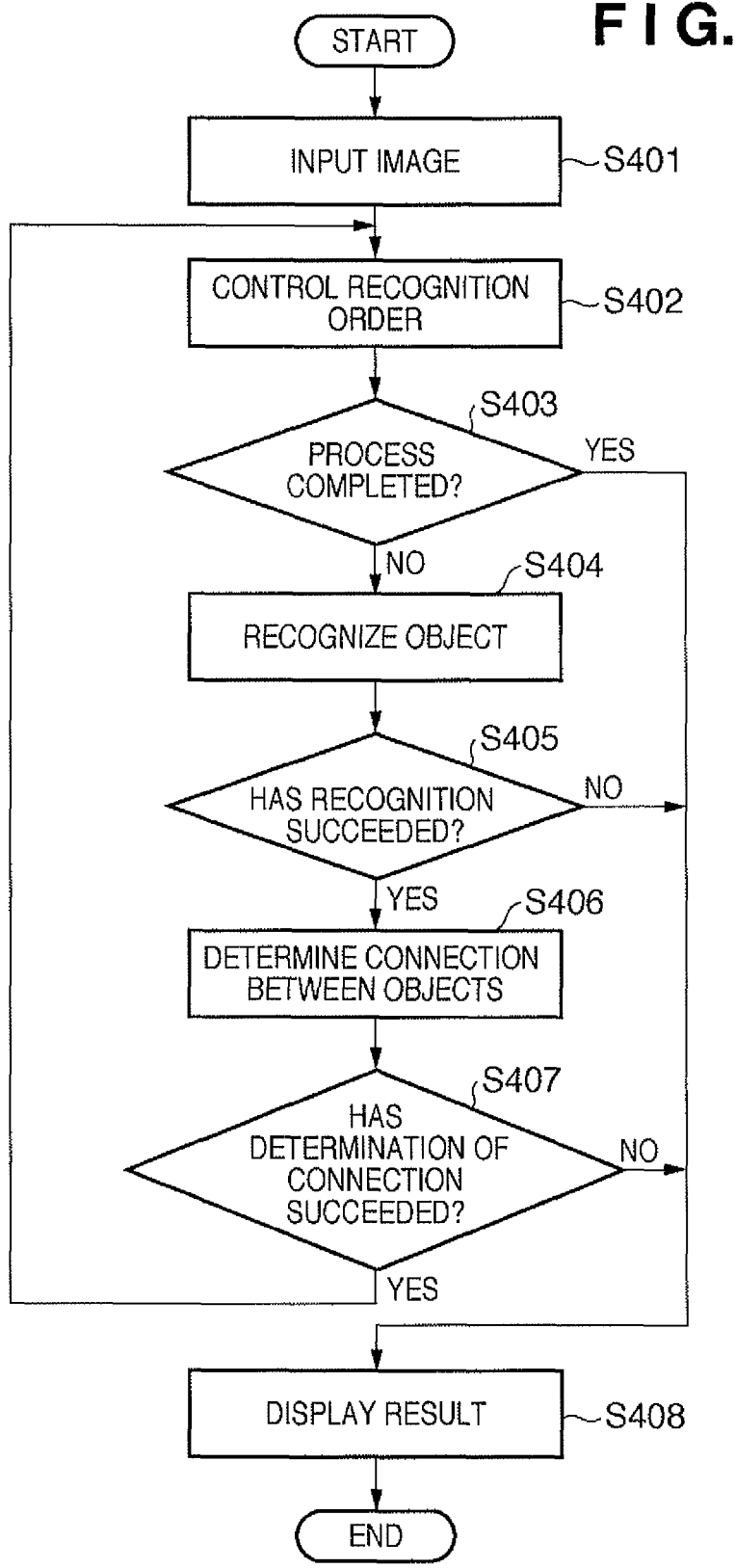
FIG. 4 is a flow chart explaining image recognition processing according to the first exemplary embodiment.

FIG. 4 is a flow chart showing an example of image recognition processing according to the present exemplary embodiment. Referring to this flow chart, an image recognition method according to the present exemplary embodiment will be described.

In step S401, the image input unit 104 inputs an image of a target that is subjected to recognition processing. Then, in step S402, the recognition-order control unit 103 selects an object to be recognized in an object-recognition order in which a plurality of targets are associated. Hereinafter, recognition and connection-determination processing from steps S403 to S407 is performed on an object selected in the recognition order.

In accordance with the object-recognition order, the recognition-order control unit 103 selects the first object in the object-recognition order and instructs the recognition unit 102 to recognize the object (step S404). In the case of the first object, however, there is no target to determine a connective relationship with the first object. Thus, after the recognition unit 102 has succeeded in recognizing the first object, the recognition-order control unit 103 selects the second object in the object-recognition order and instructs the recognition unit 102 to recognize the second object (step S402). The processing described above is performed on the first object in the recognition order, which is different from the processing performed on the second and later objects because there is no object to determine a connective relationship with the first object. Note that the above-described processing performed on the first object is not shown in the flow chart.

Next, after the recognition unit 102 has succeeded in recognizing the second object selected, the recognition-order control unit 103 causes the connection determination unit 101 to determine if there is a connective relationship between the first object and the second object in the recognition order. This processing corresponds to steps S405 and S406. If the connection determination unit 101 has succeeded in determining a connection, then the recognition-order control unit 103 repeats the above-described processing on a next object in the recognition order (steps S407 and S402). Thereafter, the above-described processing is repeated (step S403) until the last object in the recognition order is recognized and the determination of a connective relationship between the last object and the second last object in the recognition order ended in success. Through the processing described above, the selection of an object, the recognition, and the determination of a connection are repeatedly performed according to the object-recognition order.

If the recognition-order control unit 103 could not select a next object, that is, if the recognition processing performed on the last object in the object-recognition order in which a plurality of targets are associated has been completed, the process goes from step S403 to step S408.

During the repetition of the above-described processing, the recognition of a selected object in step S404 is performed by the recognition unit 102 as described previously. The operation of the recognition unit 102 is also as described above. If the recognition has succeeded as a result of the processing performed by the recognition unit 102, the process goes to step S405 and then to step S406; if recognition has failed, the process goes to step S408.

In step S406, the connection determination unit 101 determines if there is a connective relationship between the selected object and the object selected immediately before that object. The operation of the connection determination unit 101 is also as described above. Then, if the connection determination unit 101 has succeeded in determining a connective relationship, the process returns to step S402; if the determination has failed, the process goes to step S408.

In step S408, the display unit 105 displays the recognition result. The operation of the display unit 105 is as described above. For example, the display unit 105 displays the region of a target extracted from an input image by filling the region in with a predetermined color, thereby explicitly showing the region of the recognized target. For example, a person and his or her bag are displayed explicitly. Note that if the process goes from step S405 or S407 to step S408, the display unit 105 displays a message indicating that the processing has failed, etc.

Second Exemplary Embodiment

Figure 5:
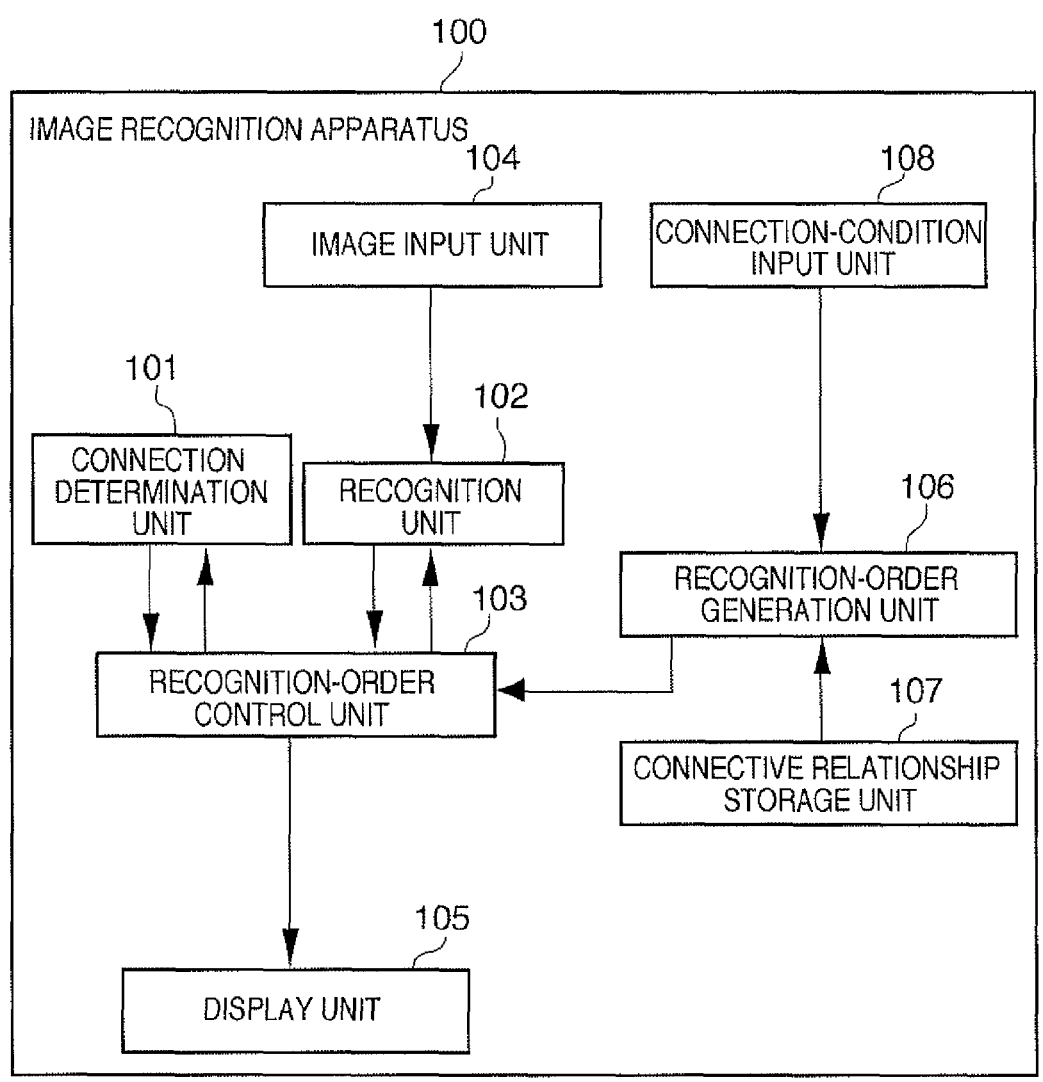
FIG. 5 is a block diagram of another exemplary configuration of an image recognition apparatus according to a second exemplary embodiment.

FIG. 5 is a block diagram showing an exemplary configuration of an image recognition apparatus according to a second exemplary embodiment. In addition to the exemplary configuration of the image recognition apparatus according to the first exemplary embodiment (FIG. 1), a recognition-condition input unit 108, a recognition-order generation unit 106, and a connective relationship storage unit 107 are additionally provided.

The recognition-condition input unit 108 inputs a plurality of targets that are to be associated. For example, in the case of recognizing a bag carried by a person A, the recognition-condition input unit 108 inputs the face of the person A and the bag as targets. Such an input is made by the user indicating a desired target.

The connective relationship storage unit 107 stores connective relationship information that indicates the connective relationships between various objects. For example, a table that provides a listing of pairs of objects having a connective relationship, such as a bag and an arm, an arm and a body, a body and a neck, and a neck and a face, as shown in FIG. 6, is stored as connective relationship information.

The recognition-order generation unit 106 generates an object-recognition order for use in the recognition-order control unit 103 from the connective relationship information stored in the connective relationship storage unit 107 and the information from the recognition-condition input unit 108. Generating an object-recognition order in the recognition-order generation unit 106 enables the association of all sorts of objects that have known connective relationships, thus making general-purpose recognition possible.

Figure 7:
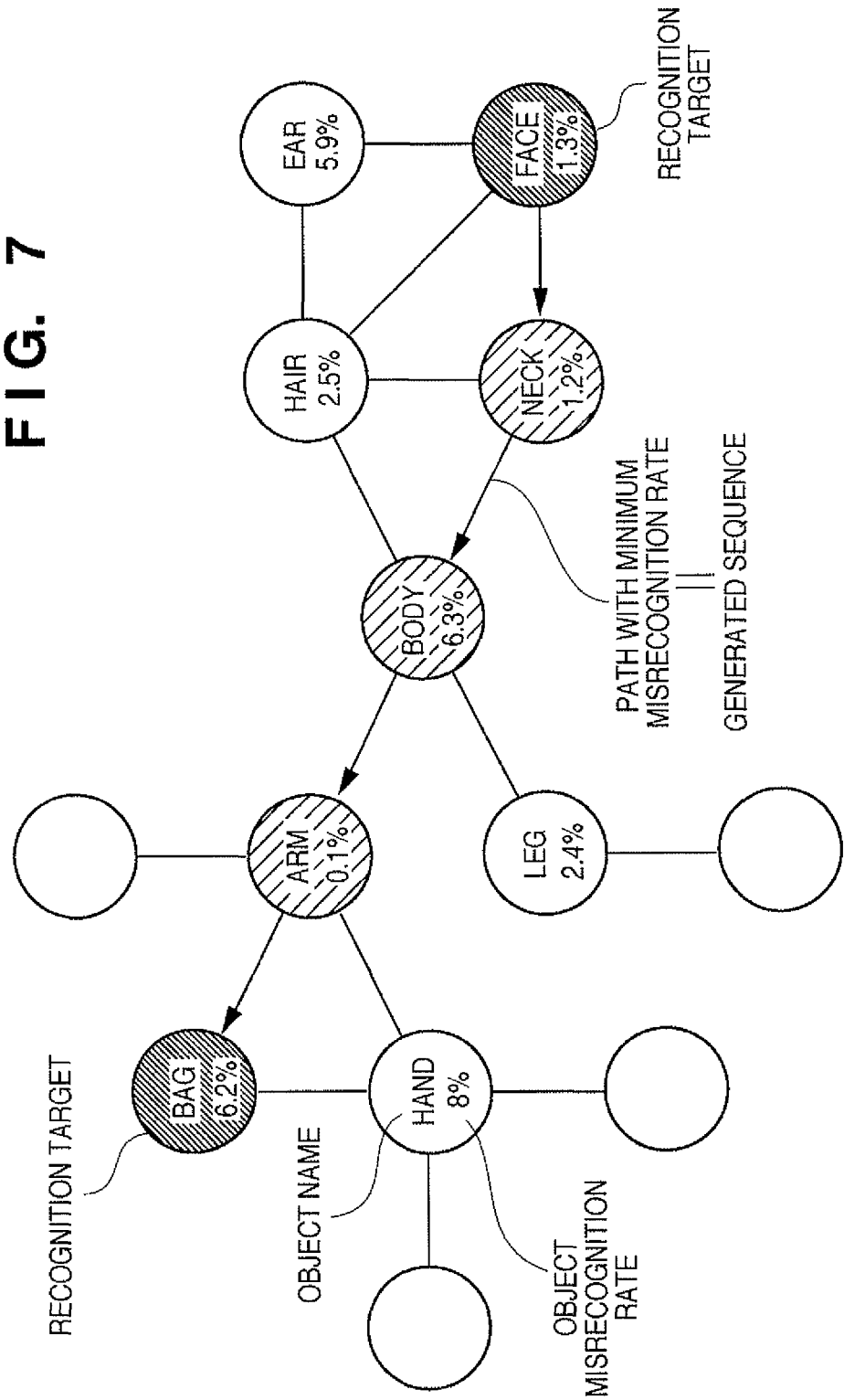
FIG. 7 shows an example of a connective relationship graph according to the second exemplary embodiment.

Now, the operation of the recognition-order generation unit 106 will be described. As a first step, a graph as shown in FIG. 7 that represents the connective relationships between objects is generated from the information (FIG. 6) that is stored in the connective relationship storage unit 107 and that represents the connective relationships between objects. Then, a recognition order is generated by tracking the generated graph. Specifically, if one of a plurality of targets that has been set by the recognition-condition input unit 108 is a starting point and another one of the targets is an end point, the above generated graph is tracked from the starting point to the end point so as to generate an object-recognition order. Note that, since connective relationships have symmetry, whichever object is defined as the starting point or the end point has no influence on the generation of an object-recognition order. In addition, although various algorithms are conceivable for the generation of an object-recognition order, the present invention may use any of such algorithms for the generation of a recognition order.

If a recognition order is generated based on such connective relationship information, a plurality of candidates for the recognition order are obtained. It is thus necessary to decide a recognition order used in recognition processing from among such a plurality of candidates for the recognition order. Here, a method for generating (selecting) an object-recognition order that minimizes a specific evaluation value for recognition processing will be described by way of example. Generating an object-recognition order that minimizes a certain evaluation value enables high-precision and high-speed recognition. Examples of such an evaluation value to be used include a total number of objects that need to be recognized, a sum total of the rates of misrecognition of each object, and so on. An evaluation value to be minimized may be selected depending on the purpose. For example, recognition that is required to be performed as fast as possible can be implemented by generating an object-recognition order that minimize a total number of objects that need to be recognized. Or, recognition that is required to be performed as precisely as possible can be implemented by generating an object-recognition order that minimizes a sum total of the rates of misrecognition of each object. Such a method for generating an object-recognition order that minimizes an evaluation value can be achieved using a known algorithm such as Dijkstra's algorithm that solves the shortest route problem. If an object-recognition order that minimizes a total sum of the rates of misrecognition is generated in the case of associating the face of the person A and the bag in the graph shown in FIG. 7, the recognition order is as follows: face, neck, body, arm, and bag. The starting point and the end point may be reversed in order, in which case the recognition order is as follows: bag, arm, body, neck, and face.

Figure 8:
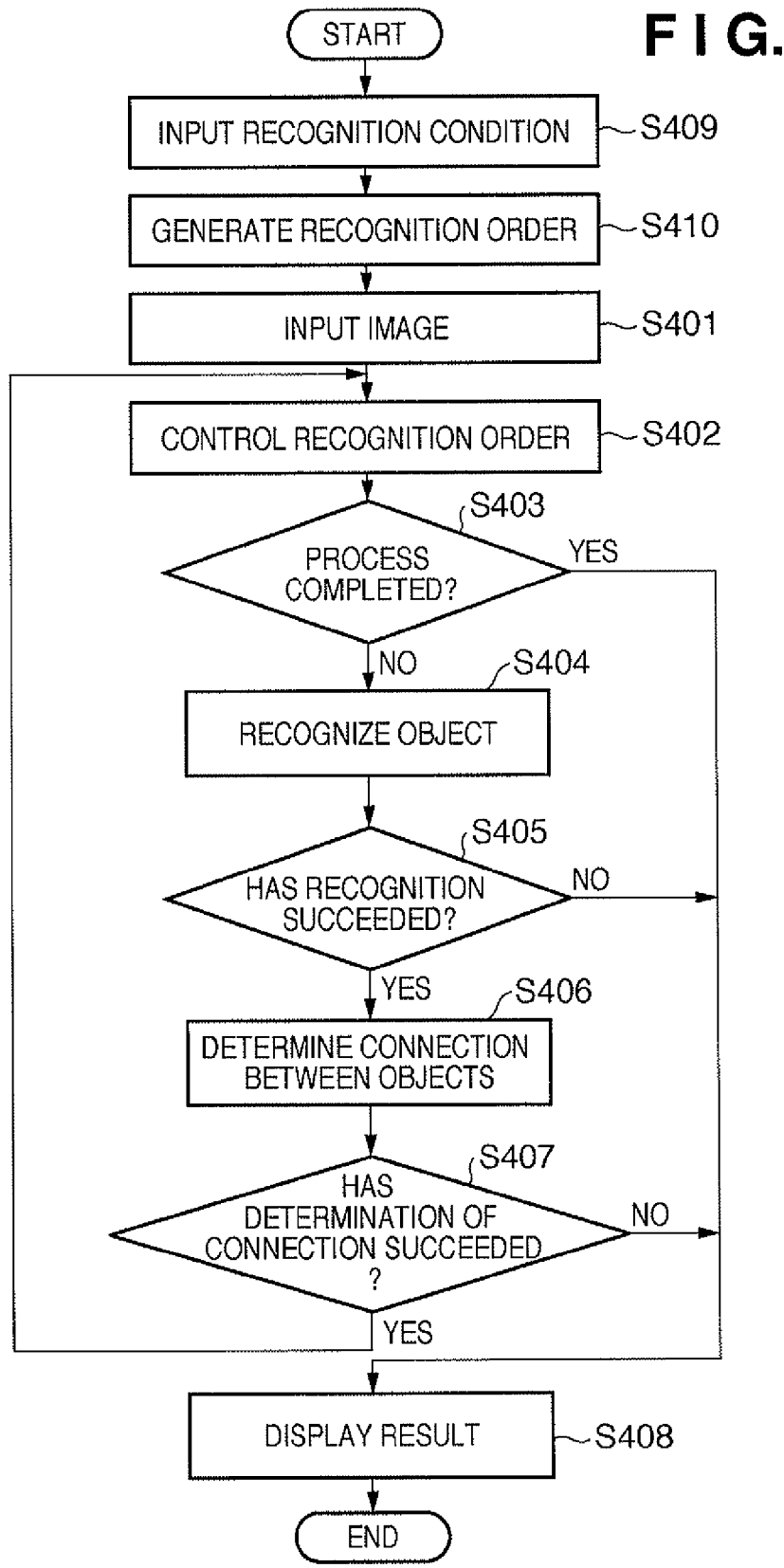
FIG. 8 is a flow chart showing image recognition processing according to the second exemplary embodiment.

FIG. 8 is a flow chart showing image recognition processing according to the second exemplary embodiment.

The processing of step S409 for inputting recognition conditions and the processing of step S410 for generating a recognition order are added to the exemplary flow chart described in the first exemplary embodiment.

In step S409, the recognition-condition input unit 108 accepts input of a plurality of targets that are to be associated from a user. The operation of the recognition-condition input unit 108 is as described in the description of the configuration of the image recognition apparatus 100.

Then in step S410, the recognition-order generation unit 106 generates an object-recognition order used in the recognition-order control unit 103 from the information (FIG. 6) stored in the connective relationship storage unit 107 and the information about targets input from the recognition-condition input unit 108. The operation of the recognition-order generation unit 106 is as described previously with reference to FIG. 7, etc. Generating an object-recognition order enables the association of all sorts of objects that have known connective relationships, thus making general-purpose recognition possible.

Thereafter, through the same processing as described in the first exemplary embodiment (steps S401 to S408), recognition order is controlled using the object-recognition order generated in step S410.

As described above, the second exemplary embodiment eliminates the need to prepare all recognition orders in advance by generating a recognition order every time before starting the processing for associating a plurality of targets. In addition, by changing an evaluation value used for the generation of a recognition order depending on the purpose, the second exemplary embodiment enables the generation of a recognition order that shortens a total processing time or a recognition order that improves accuracy, thus allowing flexible recognition processing.

Third Exemplary Embodiment

Figure 11:
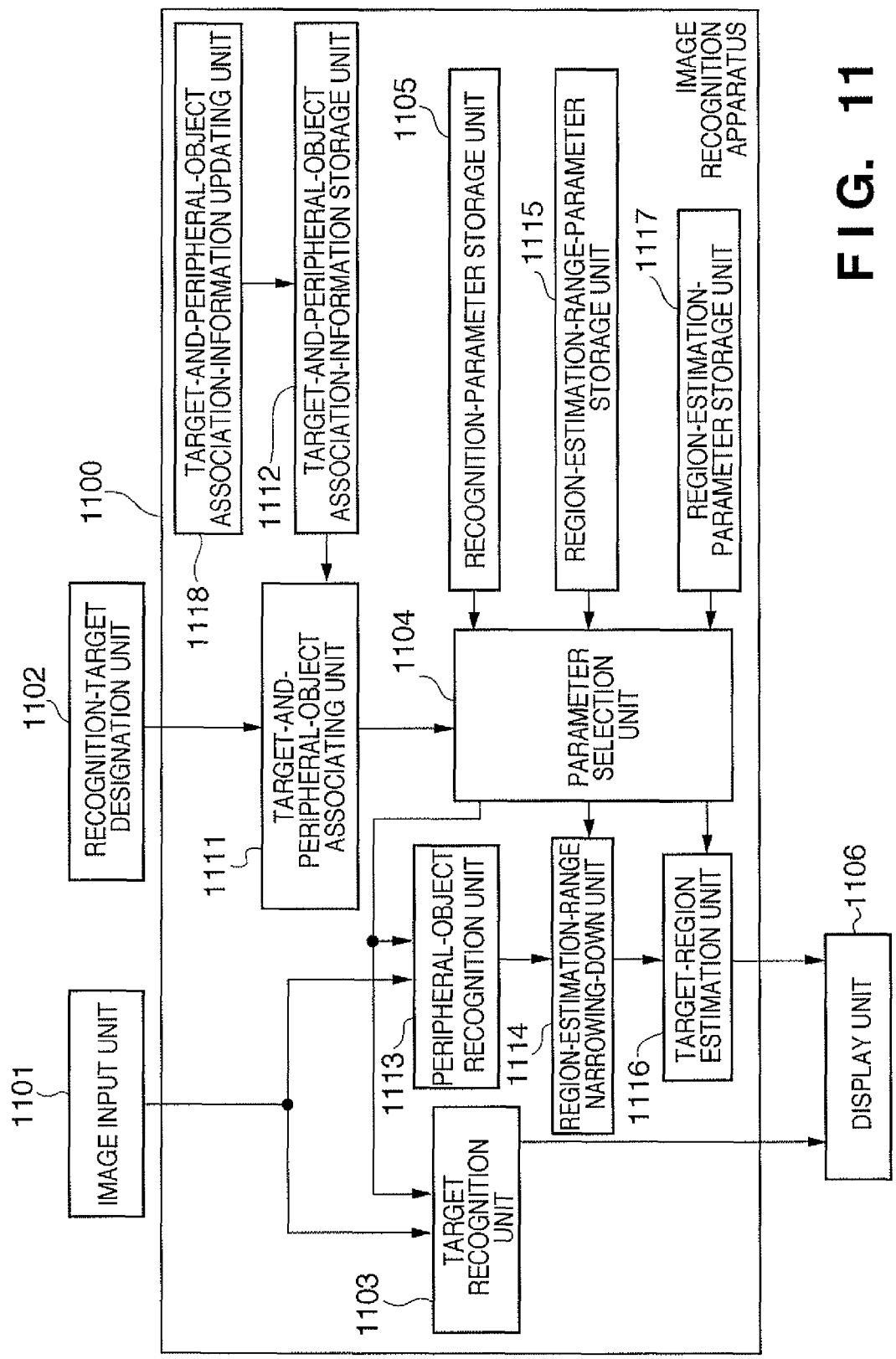
FIG. 11 is a block diagram showing an exemplary configuration of an image recognition apparatus according to a third exemplary embodiment.

FIG. 11 is a block diagram showing an example of a system configuration of an image recognition apparatus 1100 according to a third exemplary embodiment.

In FIG. 11, 1101 denotes an image input unit; 1102 denotes a recognition-target designation unit; and 1106 denotes a display unit. The image input unit 1101, the recognition-target designation unit 1102, and the display unit 1106 are connected to the image recognition apparatus 1100. The image input unit 1101 inputs an image that is subjected to recognition processing into the image recognition apparatus 1100. The image input unit 1101 may be an image input device such as a network camera, a digital camera, or a scanner, for example. A user is capable of designating a target to be recognized with the recognition-target designation unit 1102. For example, in the case of recognizing a bag in an input image, a bag is designated as a recognition target. The display unit 1106 displays a region of a target recognized from an input image, the number of such recognized targets, etc., according to the result of the processing performed by the image recognition apparatus 1100.

The image recognition apparatus 1100 includes a target-and-peripheral-object associating unit 1111, a target-and-peripheral-object association-information storage unit 1112, a target recognition unit 1103, a peripheral-object recognition unit 1113, and a parameter selection unit 1104. The image recognition apparatus 1100 further includes a recognition-parameter storage unit 1105, a region-estimation-range-parameter storage unit 1115, a region-estimation-parameter storage unit 1117, a region-estimation-range narrowing-down unit 1114, a target-region estimation unit 1116, and a target-and-peripheral-object association-information updating unit 1118.

The target-and-peripheral-object associating unit 1111 sets a to-be-recognized peripheral object that is related to a recognition target set by the recognition-target designation unit 1102, using information stored in the target-and-peripheral-object association-information storage unit 1112. The target-and-peripheral-object association-information storage unit 1112 stores association information that associates recognition targets and their corresponding to-be-recognized peripheral objects as shown in FIG. 12. The term "to-be-recognized peripheral object" as used herein refers to an object that has a certain positional or connective relationship with a recognition target and that is considered as being in the vicinity of the recognition target with a high frequency. For example, if the recognition target is a bag, objects such as hands, arms, and shoulders that are always in contact with a bag as shown in FIGS. 13A to 13C when a person carries the bag are set as to-be-recognized peripheral objects. To-be-recognized peripheral objects may preferably be selected from objects that are easier to recognize than a recognition target, specifically, objects that have smaller variations than a recognition target or objects whose features change little. In the case of a bag for example, although bags have a wide variety in terms of color and shape, there are generally not so many variations in the way of carrying a bag; for this reason, it is conceivable that objects carrying a bag, such as hands, arms, and shoulders, are easier to recognize than recognizing the bag itself.

The target-and-peripheral-object association-information updating unit 1118 performs editing, such as addition or updating, of the association information that is stored in the target-and-peripheral-object association-information storage unit 1112 and that associates recognition targets and their corresponding to-be-recognized peripheral objects. For example, in the case where the recognition target is a bag and only hands as shown in FIGS. 13A and 13B are registered as to-be-recognized peripheral objects, another hand as shown in FIG. 13C can be additionally registered as a new to-be-recognized peripheral object. In this way, adding or updating the association information that associates recognition targets and their corresponding to-be-recognized peripheral objects increases flexibility in the association information, thus making the recognition of various recognition targets possible.

The parameter selection unit 1104 selects from each parameter storage unit (1105, 1115, and 1117) a parameter that is necessary for each processing performed by the target recognition unit 1103, the peripheral-object recognition unit 1113, the region-estimation-range narrowing-down unit 1114, and the target-region estimation unit 1116. Each parameter storage unit stores not only parameters for certain recognition targets or their corresponding to-be-recognized peripheral objects, but also parameters for various objects. The parameter selection unit 1104 selects parameters related to the recognition target and to-be-recognized peripheral object that have been set by the target-and-peripheral-object associating unit 1111 and then transmits the selected parameters to the processing units. The details of each parameter will be described later in the description of each processing unit.

An input image from the image input unit 1101 is input into the target recognition unit 1103 and the peripheral-object recognition unit 1113. The target recognition unit 1103 recognizes a recognition target, whereas the peripheral-object recognition unit 1113 recognizes a to-be-recognized peripheral object. Although various algorithms have been proposed for such recognition, the present invention is not bound to a recognition algorithm; algorithms may be changed depending on a recognition target or a to-be-recognized peripheral object. The target recognition unit 1103 performs recognition using a recognition parameter regarding the recognition target transmitted from the parameter selection unit 1104, whereas the peripheral-object recognition unit 1113 performs recognition processing using a recognition parameter regarding the to-be-recognized peripheral object transmitted from the parameter selection unit 1104.

For example, in the case where the recognition target is a bag, since bags are of various kinds as shown in FIGS. 9A to 9C, recognition parameters are generated for various known bags. The term "recognition parameter" as used herein refers to information such as feature quantities of a known object and coefficients generated from the feature quantities of a known object, which is the information necessary for each recognition unit to perform recognition processing. The "feature quantity" as used herein is a numerical value that represents a unique feature for use in discriminating a certain object; one conceivable example is a numerical value that represents information such as an edge or a color, for example. In order to discriminate a certain object, it is generally necessary to determine a plurality of feature quantities, and such a set of necessary feature quantities is referred to as a feature vector. The recognition parameter may take various forms depending on the recognition algorithms. By way of example, the recognition parameters used in two recognition algorithms will now be described below.

The first example is an algorithm in which a certain feature quantity is extracted from an input image and recognition is performed depending on the similarity between the extracted feature quantity and the feature quantity of a known recognition target or a to-be-recognized peripheral object. One example is a method for determining the similarity using a feature vector that represents feature quantities; this algorithm is as described in the first exemplary embodiment with reference to FIG. 3 and thus will not be described herein.

The second example is an algorithm using a neural network. In the case of using a neural network, a synaptic weight value is generated by learning. The state of each neuron of a neural network is updated according to the following expression:

$$Ui = \Sigma Wij * Xj$$

$$Xi = \tan h(Ui) \quad \text{(Expression 2)}$$

where Ui is the internal state of a neuron i, Wij is the synaptic weight value between neurons i and j, and Xj is the output of a neuron j.

In addition, a neural network learns a synaptic weight value according to the following expression:

$$Wij(t+\Delta t) = Wij(t) + \Delta Wij$$

$$\Delta Wij = -\eta \partial E / \partial Wij$$

$$E = \frac{1}{2}(\Sigma(Xi - Xdi)2) \quad \text{(Expression 3)}$$

where η is a learning coefficient, E is an error function, and Xdi is a teacher signal with respect to the neuron i.

For example, consider the case where:
monochrome-converted pixel values of an input image that have been normalized from −1 to 1 are input into a neural network; and
learning is structured so that the value "1" is output from only those neurons that are equivalent to pixels that include a recognition target and the value "−1" is output from the other neurons.

In this case, learning is implemented by inputting an image that includes a known recognition target and a known to-be-recognized peripheral object and then giving a region of the recognition target or the to-be-recognized peripheral object as a teacher signal to a neural network. The teacher signal Xdi gives the value "1" to the neurons that are included in the region of the recognition target or the to-be-recognized peripheral object and gives the value "−1" to the other neurons. A synaptic weight value is generated by this learning rule, and recognition processing is performed using the generated synaptic weight value. As a result of such processing, a region that includes a neuron that outputs the value "1" is the region of the recognition target or the to-be-recognized peripheral object. In the case of this algorithm, the recognition parameter is the synaptic weight value Wij of the neural network obtained as a result of such learning. In this way, the recognition parameter may take various forms depending on the algorithms.

Figure 15A:
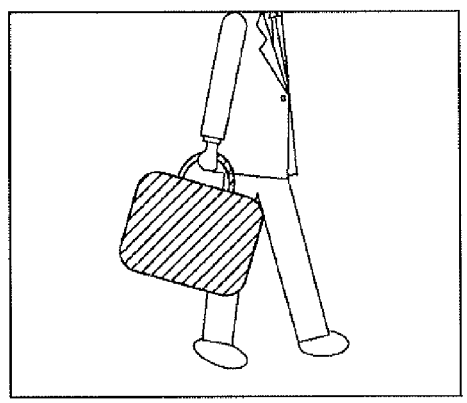
FIG. 15A shows an example of an input image according to the third exemplary embodiment.
Figure 15B:
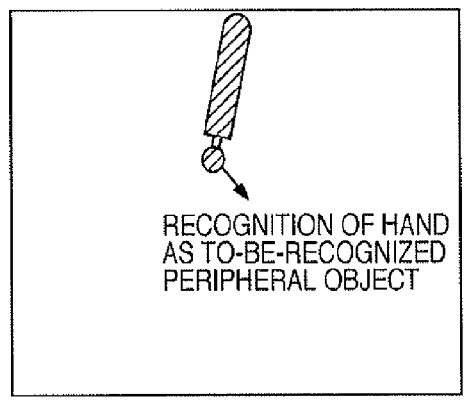
FIG. 15B shows an example of the result of recognition of a peripheral object according to the third exemplary embodiment.
Figure 16A:
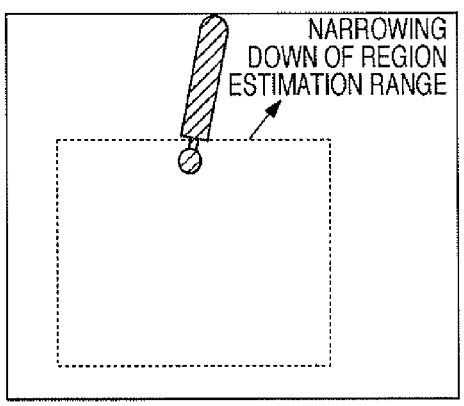
FIG. 16A shows an example of the result of narrowing-down processing of the range of region estimation according to the third exemplary embodiment.

If the peripheral-object recognition unit 1113 has recognized a to-be-recognized peripheral object, the region-estimation-range narrowing-down unit 1114 narrows down the range of the region estimation processing performed in the later step. Through this processing, the range of processing performed by the target-region estimation unit 1116 is narrowed down, which results in an increase in the processing speed. The region-estimation-range-parameter storage unit 1115 stores information as shown in FIG. 14 that is used for estimating an approximate position of a recognition target with respect to a to-be-recognized peripheral object in the processing performed by the region-estimation-range narrowing-down unit 1114. For example, consider the case where the peripheral-object recognition unit 1113 has recognized a hand as shown in FIG. 15B from an input image as shown in FIG. 15A. In this case, if the recognition target is a bag, a square region indicated by the broken line in FIG. 16A is set as a region where a bag is likely to exist with respect to the hand recognized as a to-be-recognized peripheral object, using a region-estimation-range parameter as shown in FIG. 14.

The target-region estimation unit 1116 estimates a region where a recognition target is likely to exist in an input image, based on the positional or connective relationships between the recognition target and the to-be-recognized peripheral object recognized by the peripheral-object recognition unit 1113. Such region estimation is implemented by extracting a region using a known region extraction algorithm and additionally determining positional and connective relationships between the recognition target and the to-be-recognized peripheral object. Examples of such a region extraction algorithm include algorithms as described in References 1 to 4 listed below; however, the present invention is not bound to any sort of region extraction algorithms.

[Reference 1] Japanese Patent Laid-Open No. 10-63855.

[Reference 2] M. Kass, A. Witkin, and D. Terzopoulos, "Snakes: Active Contour Models," Int. J. Computer Vision, pp. 321-331, 1988.

[Reference 3] Yuki Matsuzawa and Toru Abe, "Region Extraction Using Competition of Multiple Active Contour Models," Institute of Electronics, Information and Communication Engineers of Japan (D-II), Vol. J83-D-II, No. 4, pp. 1100-1109, 2000.

[Reference 4] Toru Tamaki, Tsuyoshi Yamamura, and Noboru Ohnishi, "A Method for Extracting an Object by Segmentation based on General Information between Regions," the Journal of the Institute of Image Information and Television Engineers, vol. 55, No. 4, pp. 571-582, 2001.

Now, the processing performed by the target-region estimation unit 1116 using a region extraction method based on color similarity (the technique described in Reference 1) will be described by way of example.

Figure 16B:
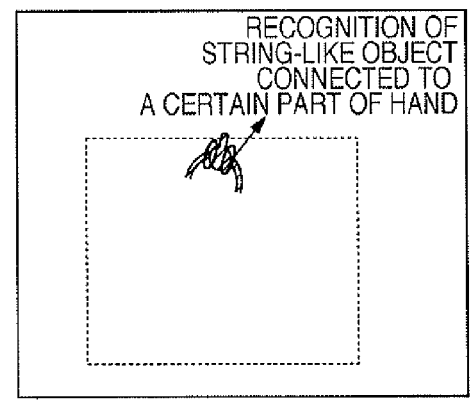
FIG. 16B is a diagram for explaining target-region estimation processing according to the third exemplary embodiment.

Assume that the recognition target is a bag and a hand as shown in FIG. 15A has been recognized as a to-be-recognized peripheral object. In this case, the target-region estimation unit 1116 recognizes the handle of a bag as a first step. Specifically, a string-like object (or a "linear object") that is connected to a certain position of the hand is recognized (FIG. 16B). In this case, the parameters stored in the region-estimation-parameter storage unit 1117 are information that is used in such recognition processing and that indicates positions, connections, or objects to be recognized. FIG. 21 shows an example of such region estimation parameters stored in the region-estimation-parameter storage unit 117. The region-estimation-parameter storage unit 117 holds region estimation parameters that define objects to be recognized and their connective relationships for every combination of objects to be recognized and their related peripheral objects. The target-region estimation unit 1116 searches for an object indicated by a region estimation parameter for the peripheral object recognized by the peripheral-object recognition unit 1113, thereby estimating a region of a certain object. The region-estimation-range-parameter storage unit 1115 holds region-estimation-range parameters that define the range of region estimation for every combination of objects to be recognized and their related peripheral objects. The region-estimation-range narrowing-down unit 1114 narrows down the range of object search into the range indicated by a region-estimation-range parameter.

For example, a string-like object that is connected to a certain position of a hand is recognized as follows. First, a string-like object in the vicinity of the hand is recognized. Such recognition is performed using a similar algorithm to that used in the target recognition unit 1103 or the peripheral-object recognition unit 1113. As described previously, the algorithms may be changed depending on the targets to be recognized. Note that the present invention is not bound to a recognition algorithm.

If a string-like object has been recognized, a string-like object that is connected at one edge to a certain position of the hand is extracted. The presence or absence of a connective relationship can be determined by extracting the edge of the string-like object and the edge of the hand and then determining if there is any common part of the edge between both of the objects. If a string-like object that is connected to a certain position of the hand has been extracted, then color information on the string-like object is extracted. Then, based on the extracted color information, a region of a similar color is extracted. If a region of a similar color has been extracted, a region that is connected to the recognized string-like object and that is of a similar color is extracted. The presence or absence of a connective relationship can be determined as described previously by determining if there is a common part of the edge between both of the objects.

Figure 17A:
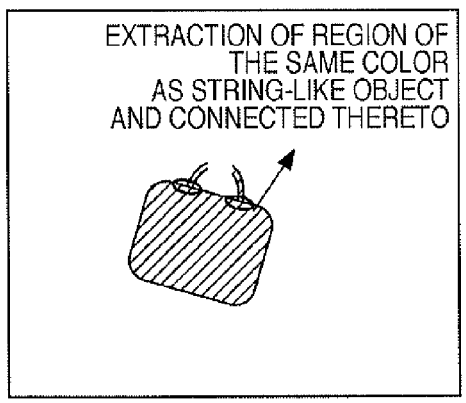
FIG. 17A shows an example of the result of target-region estimation processing according to the third exemplary embodiment.
Figure 17B:
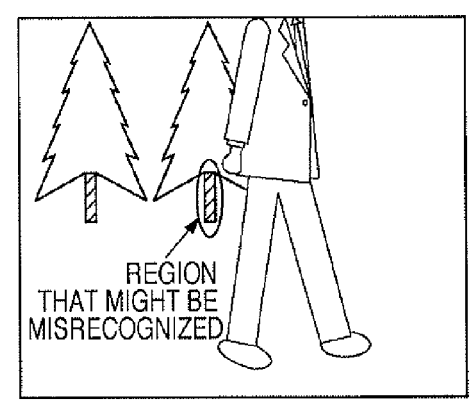
FIG. 17B shows an example of an input image that may cause misrecognition.

The region extracted through the above processing is estimated to be a region of a bag (FIG. 17A). In this target-region estimation processing, determining not only the positional relation but also the connective relationship is very important. For example, consider the case where an image as shown in FIG. 17B is input and region extraction is performed based on only the positional relation. Assume herein that information stating that "a brown object in a region below a hand is a bag" is given as a region extraction parameter. In this case, the region of a bag can be extracted properly from the input image shown in FIG. 15A; however, in the case of the input image shown in FIG. 17B, the trunk of a tree that is not connected to the hand may also be extracted by mistake as a region of a bag.

The display unit 1106 displays a region of a recognized target, the number of recognized targets, and so on as a result of the processing performed by the target recognition unit 1103 or the target-region estimation unit 1116. For example, in the case of displaying a region, the display unit 1106 fills in the region of a recognition target, which has been extracted from an input image through the processing performed by the target recognition unit 1103 or the target-region estimation unit 1116, with a predetermined color for display. In the case of displaying the number of recognition targets, the display unit 1106 counts the number of extracted recognition targets in an image and displays the result of such counting.

Figure 18:
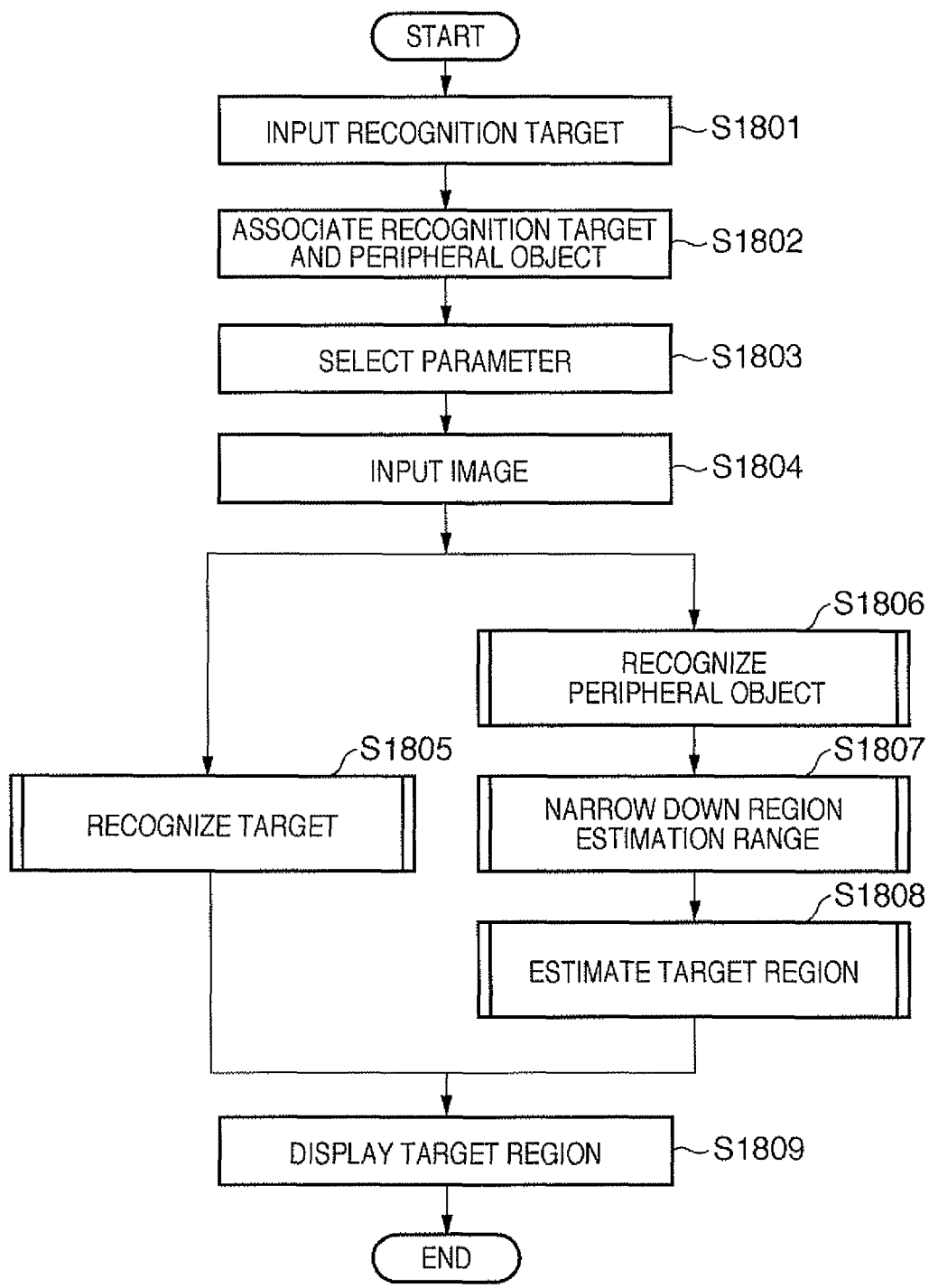
FIG. 18 is a flow chart showing image recognition processing according to the third exemplary embodiment.

FIG. 18 is a flow chart for explaining recognition-target extraction processing according to the third exemplary embodiment. The operation of a system configuration according to the present exemplary embodiment will now be described by referring to the flow chart shown in FIG. 18.

First, in step S1801, the recognition-target designation unit 1102 accepts and sets the designation of a recognition target to be recognized in an image. For example, in the case of recognizing a bag in an image, a user designates a bag as a recognition target and the recognition-target designation unit 1102 accepts the designation. The recognition-target designation unit 1102 provides a user interface for such designation.

Then, in step S1802, the target-and-peripheral-object associating unit 1111 sets a to-be-recognized peripheral object related to the recognition target that has been set by the recognition-target designation unit 1102, by referring to the target-and-peripheral-object association-information storage unit 1112. For example, if a bag has been recognized as a recognition target, an object such as a hand, an arm, or a shoulder is set as a to-be-recognized peripheral object.

Then, in step S1803, the parameter selection unit 1104 selects a parameter necessary for each processing unit according to the set recognition target and to-be-recognized peripheral object. The parameter selection unit 1104 selects a recognition parameter regarding the recognition target and for use in the target recognition unit 1103, from the recognition-parameter storage unit 1105. For example, if the recognition target is a bag, the parameter selection unit 1104 selects a recognition parameter regarding a bag for the target recognition unit 1103. The parameter selection unit 1104 also selects a recognition parameter regarding the to-be-recognized peripheral object set in step S1802 and for use in the peripheral-object recognition unit 1113, from the recognition-parameter storage unit 1105. For example, if the recognition target is a bag, the parameter selection unit 1104 selects a recognition parameter regarding a to-be-recognized peripheral object related to the bag, such as a hand, an arm, or a shoulder, for the peripheral-object recognition unit 1113. The parameter selection unit 1104 further refers to the region-estimation-range-parameter storage unit 1115 so as to select a region-estimation-range parameter related to the recognition target and the to-be-recognized peripheral object, for the region-estimation-range narrowing-down unit 1114. For example, if the recognition target is a bag and the to-be-recognized peripheral object is a hand, the parameter selection unit 1104 selects a region-estimation-range parameter that represents a region where a bag is likely to exist with respect to a certain hand for the region-estimation-range narrowing-down unit 1114. The parameter selection unit 1104 further refers to the region-estimation-parameter storage unit 1117 so as to select a region estimation parameter regarding the recognition target and the to-be-recognized peripheral object, for the target-region estimation unit 1116. For example, if the recognition target is a bag and the to-be-recognized peripheral object is a hand, the parameter selection unit 1104 selects a region estimation-parameter that represents connection and positional relations between a certain hand and a bag.

Then, in step S1804, the image input unit 1101 inputs an image that is subjected to image recognition. In the present example, an image as shown in FIG. 15A is input as an input image.

Then, the target recognition unit 1103 recognizes a recognition target in step S1805 and the peripheral-object recognition unit 1113 recognizes a to-be-recognized peripheral object in step S1806. The recognition of the recognition target and the to-be-recognized peripheral object may be performed simultaneously or sequentially. If the recognition of a recognition target and a to-be-recognized peripheral object is performed sequentially, the recognition of a to-be-recognized peripheral object may be performed only when the recognition of a target has failed. Recognition processing varies depending on the algorithm; by way of example, a processing procedure based on an algorithm using similarity between a feature quantity extracted from an image and a feature quantity of a known object will be described.

Figure 19:
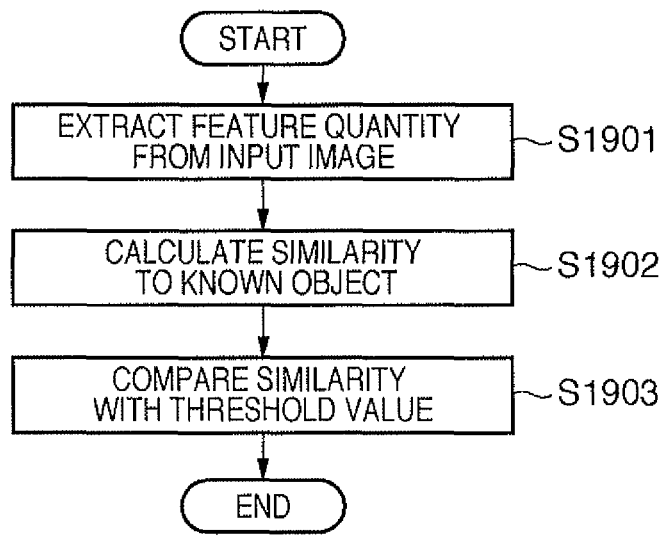
FIG. 19 is a flow chart showing the processing performed by a target recognition unit or a peripheral-object recognition unit according to the third exemplary embodiment.

FIG. 19 is a flowchart showing an example of recognition processing performed by the target recognition unit 1103 and the peripheral-object recognition unit 1113 (hereinafter those two are generically referred to as a recognition unit). First, in step S1901, the recognition unit extracts a feature quantity from an input image. Examples of such an extracted feature quantity includes an edge and a color. Then, in step S1902, the recognition unit calculates the similarity between the extracted feature quantity and a feature quantity of a known object. Such similarity can be calculated according to an expression described in the description of the recognition unit (e.g., Expression 1). Then, in step S1903, the calculated similarity, D, is compared with a threshold value, Thr. If the calculated similarity, D, is smaller than a given threshold value, Thr, it is recognized that the compared known object is in the input image.

If the peripheral-object recognition unit 1113 has recognized a to-be-recognized peripheral object in step S1806, then the region-estimation-range narrowing-down unit 1114 narrows down the range of the processing performed in the next step S1807, that is, the estimation of the region of the recognition target. FIG. 15B shows an example of such a to-be-recognized peripheral object that has been recognized. In the case where a hand carrying a bag as shown in FIG. 15B has been recognized as a to-be-recognized peripheral object, the region-estimation-range-parameter storage unit 1115 has previously stored information indicating that a bag is highly possibly within a square region indicated by the broken line shown in FIG. 16A (FIG. 14). Thus, the region-estimation-range narrowing-down unit 1114 refers to the region-estimation-range-parameter storage unit 1115 and sets this region as the range of region estimation processing.

Then, in step S1808, the target-region estimation unit 1116 estimates the region of a recognition target within the range obtained by the process of narrowing down the range of region estimation in step S1807. Various algorithms may be used for such estimation of a target region. Now, target-region extraction processing using color will be described by way of example. Although the parameters shown in FIG. 21 include no information about color, it is obvious to a person skilled in the art that, in the case where an object region is estimated using color, the parameters will include information about color.

Figure 20:
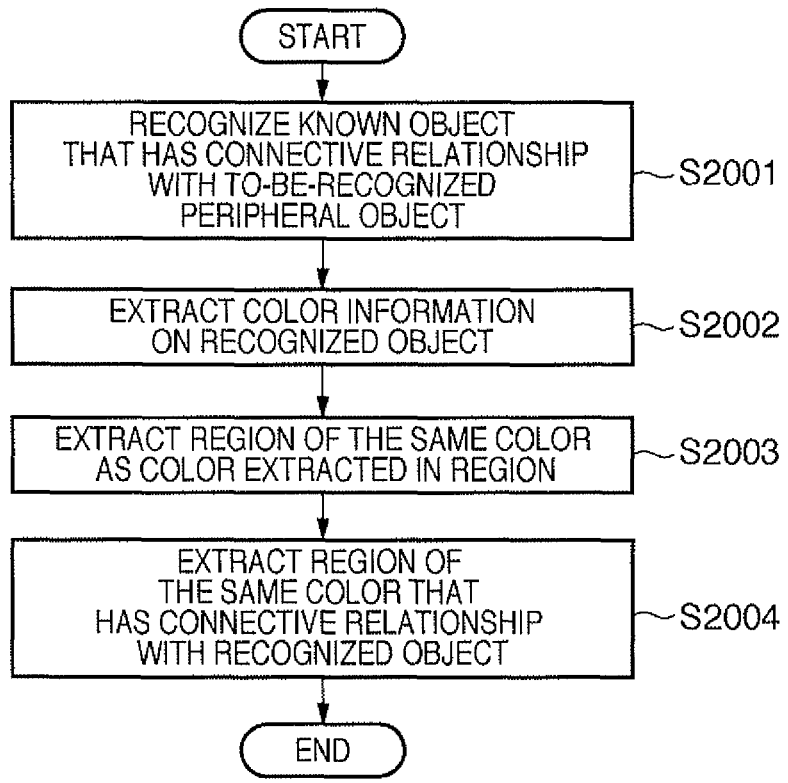
FIG. 20 is a flow chart showing the processing performed by a target-region estimation unit according to the third exemplary embodiment.
Figure 22:
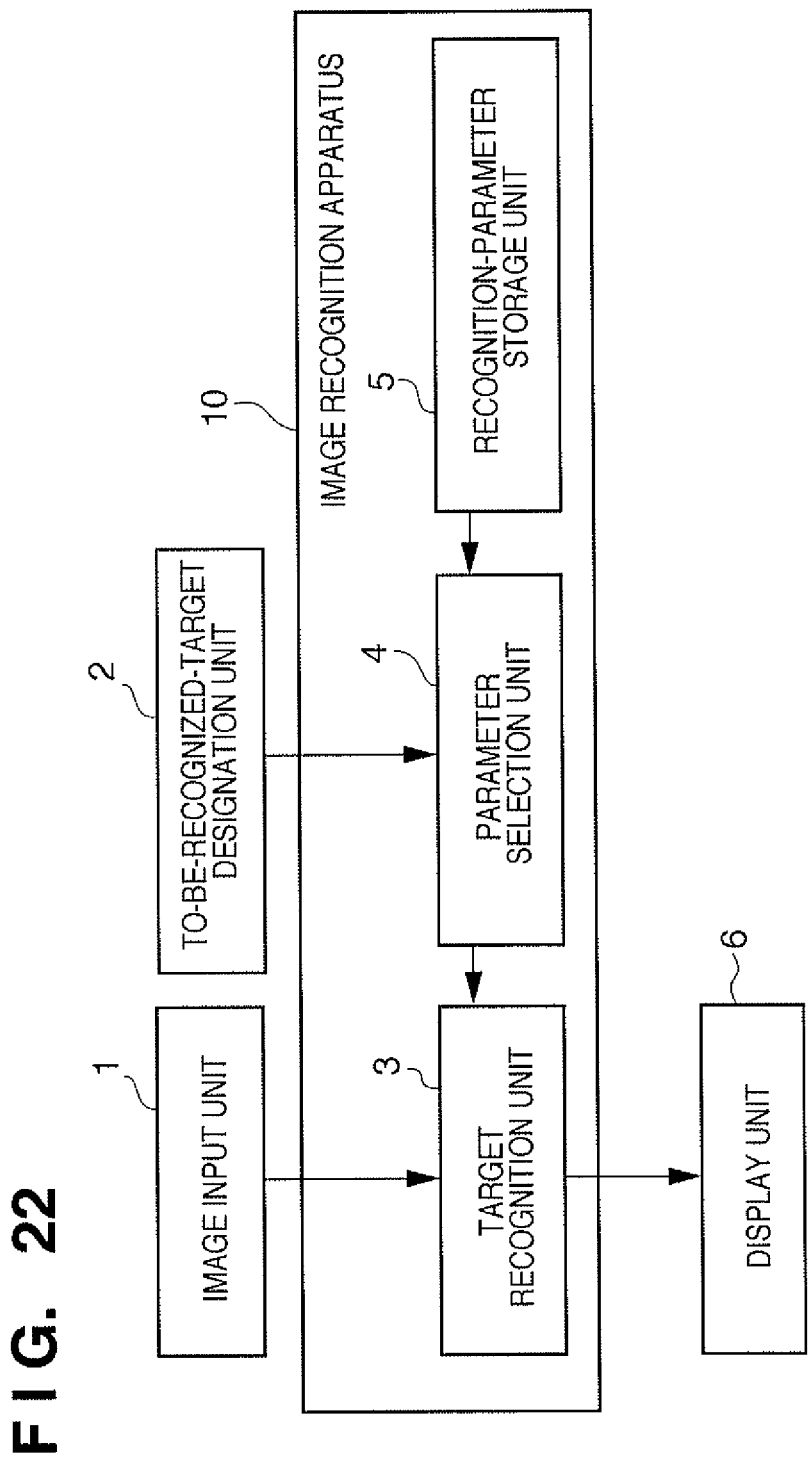
FIG. 22 illustrates a configuration of a conventional image recognition apparatus.

FIG. 20 shows a flow chart of target-region estimation processing (step S1808). Now, target-region estimation processing will be described by taking, as an example, the case where the recognition target is a bag and the to-be-recognized peripheral object is a hand.

First, a known object that has a connective relationship with the to-be-recognized peripheral object is recognized (step S2001). In the present example, the handle of a bag is recognized, for example. To recognize the handle of a bag, a string-like object is recognized, which is connected to a position of the hand recognized in the peripheral object recognition processing (step S1806) at which position the handle is likely to be attached. Such recognition may be performed using the same algorithm as used in the target recognition unit 1103 or the peripheral-object recognition unit 1113. FIG. 16B shows an example of such a recognized string-like object. After the recognition of a string-like object, the color of the recognized string-like object is extracted (step S2002). Then, a region of the same color as the extracted string-like object is extracted from the target-region estimation range (step S2003). Then, a region that is connected to the string-like object is extracted from the region of the same color as the extracted string-like object (step S2004). The extracted region is estimated to be the region of a bag. FIG. 17A shows an example of the result of such estimation.

Then, in step S1809, the display unit 1106 displays the result of the processing performed by the target recognition unit 1103 and/or the target-region estimation unit 1116, for example, displays the region of the recognized recognition target, the number of recognition targets, and so on. For example, if a recognition target has been estimated as shown in FIG. 17A, in the case of displaying a region, the region of the recognition target is displayed filled in with a specific color as shown in FIG. 17A; in the case of displaying the number of targets, a message indicating the number of targets, "1", is displayed.

Fourth Exemplary Embodiment

An input image in the third exemplary embodiment may alternatively be a moving image, instead of a still image. In the case where a moving image has been input, the target-region estimation unit 1116 may employ a method for extracting a region from a moving image, as described in Reference 5. With this algorithm, an object having the same motion vector is extracted so as to isolate a target from the background. At the time of estimating a recognition target from a to-be-recognized peripheral object, an object that has the same motion vector as the to-be-recognized peripheral object and that is connected to the to-be-recognized peripheral object can be estimated to be in the range of a recognition target. Although various algorithms for extracting a region from a moving image have been devised, the present invention is not bound to a region extraction algorithm; region estimation may be performed using any other algorithm. Similarly to the case of a still image, determining a connective relationship in the process of estimating a target region from a moving image can also be considered effective in preventing misrecognition.

[Reference 5] Japanese Patent Laid-Open No. 2001-109891

Fifth Exemplary Embodiment

If a plurality of to-be-recognized peripheral objects have been recognized in the third exemplary embodiment, processing for estimating the region of a recognition target may be performed on all such recognized to-be-recognized peripheral objects.

Sixth Exemplary Embodiment

The target recognition unit 1103 and the peripheral-object recognition unit 1113 in the third exemplary embodiment may be configured by a common recognition unit. Such a configuration results in resource savings. In this case, whether to recognize a recognition target or to recognize a to-be-recognized peripheral object can be selected by changing a recognition parameter. More specifically, the recognition of a recognition target is performed using a recognition parameter regarding a recognition target, whereas the recognition of a to-be-recognized peripheral object is performed using a recognition parameter regarding a to-be-recognized peripheral object.

Seventh Exemplary Embodiment

If, in the third, fifth, and sixth exemplary embodiments, a recognition target has been recognized as a result of the processing performed by the target recognition unit 1103, the processing performed by the peripheral-object recognition unit 1113 may be performed on a region other than the region of the recognized recognition target. On the contrary, if the target-region estimation unit 1116 has estimated the region of a recognition target, the processing performed by the target recognition unit 1103 may be performed on a region other than the estimated region of a recognition target. This reduces the range of processing, resulting in a shortened processing time.

While the exemplary embodiments have been described in detail above, the present invention can take an embodiment as a system, an apparatus, a method, a program, or a storage medium (recording medium), for example. Specifically, the present invention may be applied to a system constituted by a plurality of devices or to an apparatus composed of a single device.

According to the present invention, the use of the connective relationships between a plurality of targets enables more proper target associations.

Additionally, according to the present invention, more accurate estimation of a recognition target is possible even though a recognition target is unknown to an image recognition apparatus or even though an input image is in unfavorable conditions.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-257784, filed Oct. 2, 2008 which is hereby incorporated by reference herein in its entirety.

What is claimed is:

1. An image recognition apparatus that recognizes an object related to a specific object in an image, comprising:
   a holding unit configured to hold connective relationship information that indicates a connective relationship between objects;
   a generation unit configured to generate a plurality of candidates for a recognition order that indicates an order of recognizing objects in an object sequence including the specific object, a related object, and one or more intermediate objects connected between the specific object and the related object using the connective relationship information;
   a deciding unit configured to decide the recognition order from the plurality of candidates for the recognition order based on appreciation values calculated for respective candidates;
   a recognition unit configured to sequentially recognize objects from the image in accordance with the recognition order decided by the deciding unit;
   a connective relationship determination unit configured to determine whether or not an object recognized in a current turn of recognition performed by the recognition unit has a connective relationship with a previously extracted object obtained in a previous turn of recognition;

an obtaining unit configured to obtain an object that has been determined as having a connective relationship by the connective relationship determination unit, as an extracted object; and an associating unit configured to associate the specific object with the related object, based on one or more objects extracted by a repetition of processing performed in the recognition order by the recognition unit, the connective relationship determination unit, and the obtaining unit.

2. The apparatus according to claim 1, wherein an appreciation value indicates a number of objects existing in an object sequence indicated by a corresponding recognition order, and the deciding unit decides the recognition order that minimizes the appreciation value as the recognition order used in the recognition unit.

3. The apparatus according to claim 1, wherein an appreciation value indicates a sum total of rates of misrecognition of an object existing in an object sequence indicated by a corresponding recognition order, and the deciding unit decides the recognition order that minimizes the appreciation value as the recognition order used in the recognition unit.

4. An image recognition method for recognizing an object related to a specific object in an image, comprising:

a holding step of holding connective relationship information that indicates a connective relationship between objects;

a generation step of generating a plurality of candidates for a recognition order that indicates an order of recognizing objects in an object sequence including the specific object, a related object, and one or more intermediate objects connected between the specific object and the related object using the connective relationship information;

a deciding step of deciding the recognition order from the plurality of candidates for the recognition order based on appreciation values calculated for respective candidates;

a recognition step of sequentially recognizing objects from the image in accordance with the recognition order decided in the deciding step;

a connective relationship determination step of determining whether or not an object recognized in a current turn of recognition performed in the recognition step has a connective relationship with a previously extracted object obtained in a previous turn of recognition;

an obtaining step of obtaining an object that has been determined as having a connective relationship in the connective relationship determination step, as an extracted object; and an associating step of associating the specific object with the related object based on one or more objects extracted by a repetition of the recognition step, the connective relationship determination step, and the obtaining step in the recognition order.

5. A non-transitory computer-readable storage medium that stores a program for causing a computer to execute the image recognition method according to claim 4.

* * * * *

UNITED STATES PATENT AND TRADEMARK OFFICE
CERTIFICATE OF CORRECTION

| | |
|---|---|
| PATENT NO. | : 8,467,571 B2 |
| APPLICATION NO. | : 12/571219 |
| DATED | : June 18, 2013 |
| INVENTOR(S) | : Akiyoshi Momoi et al. |

It is certified that error appears in the above-identified patent and that said Letters Patent is hereby corrected as shown below:

<u>ON THE TITLE PAGE</u>:

Please add:

(73) Assignee: CANON KABUSHIKI KAISHA, Tokyo (JP)

Signed and Sealed this
Twenty-second Day of October, 2013

Teresa Stanek Rea
*Deputy Director of the United States Patent and Trademark Office*